United States Patent [19]

Seo

[11] Patent Number: 6,014,608

[45] Date of Patent: Jan. 11, 2000

[54] NAVIGATOR APPARATUS INFORMING OR PERIPHERAL SITUATION OF THE VEHICLE AND METHOD FOR CONTROLLING THE SAME

[75] Inventor: Chang-Kyu Seo, Suwon, Rep. of Korea

[73] Assignee: Samsung Electronics Co., Ltd.

[21] Appl. No.: 08/884,631

[22] Filed: Jun. 27, 1997

[30] Foreign Application Priority Data

Nov. 4, 1996 [KR] Rep. of Korea ............... 96-51906

[51] Int. Cl.[7] ............................................. G06G 7/78
[52] U.S. Cl. .................. 701/207; 701/208; 701/301; 348/116; 348/115; 348/118; 340/903; 340/995
[58] Field of Search .................................. 701/201, 207, 701/208, 300, 301, 302, 117, 212; 340/945, 990, 903, 435; 345/419; 348/51, 115, 116, 117, 118; 382/154; 73/178 R

[56] References Cited

U.S. PATENT DOCUMENTS

| 5,381,338 | 1/1995 | Wysocki et al. ............... 701/301 |
| 5,635,922 | 6/1997 | Cho et al. ..................... 701/301 |
| 5,826,212 | 10/1998 | Nagai .......................... 701/208 |

*Primary Examiner*—Jacques H. Louis-Jacques

*Attorney, Agent, or Firm*—Sughrue, Mion, Zinn, Macpeak & Seas, PLLC

[57] ABSTRACT

A navigation apparatus for vehicles capable of sensing the peripheral situation of a vehicle, thereby automatically displaying the sensed peripheral situation while generating an alarm when the peripheral situation is determined as a hazardous situation. The invention also provides a method for controlling the navigation apparatus. This navigation apparatus includes a current-position computing unit for computing a pseudo current position of the vehicle, based on information from a speed sensor, a gyro sensor, and pseudo coordinates of the current vehicle position provided by artificial satellites, a peripheral situation sensing unit for sensing a peripheral situation of the vehicle, a peripheral image sensing unit for picking up images of peripheral objects existing in the vicinity of the vehicle, an alarming unit for generating a sound signal informing of a hazard in response to an alarming control signal, a display unit for receiving display data and displaying the received display data on a screen, and a system control unit for computing coordinates of the current vehicle position and coordinates of the position of each peripheral object, based on the computed pseudo current vehicle position and the information from the peripheral situation sensing unit, and sending display data to the display unit.

5 Claims, 4 Drawing Sheets

NAVIGATOR APPARATUS INFORMING OR PERIPHERAL SITUATION OF THE VEHICLE AND METHOD FOR CONTROLLING THE SAME

BACKGROUND OF THE INVENTION

1. Field of the Invention

The present invention relates to a navigation apparatus, and more particularly to a navigation apparatus for vehicles capable of sensing the peripheral situation of the vehicle, thereby automatically displaying the sensed peripheral situation on a monitor while generating an alarm when the peripheral situation is determined as a hazardous situation. The present invention also relates to a method for controlling such a navigation apparatus.

2. Description of the Related Art

By virtue of developments of the electronic industry, a navigation apparatus has been incorporated in vehicles, such as sea vessels, airplanes automobiles, etc. The driver/pilot can obtain navigational information from the navigation apparatus, including the vehicle's current position, so that the driver/pilot can accurately and rapidly reach the destination. Such a navigation apparatus is generally referred to as a GPS (Global position system), and is adapted to identify the current position and moving speed of the vehicle or to determine a movement path of the vehicle.

Such a GPS apparatus receives information, indicative of the latitude, longitude and altitude associated with the current position of the vehicle, from a plurality of GPS satellites, thereby computing the current position of the vehicle. After the computation, the GPS apparatus provides map information including the current position of the vehicle in the form of a graphic display. In other words, such a conventional navigation apparatus indicates on a display the current position of the vehicle, as calculated based on the information received from the GPS satellites.

The navigation apparatus also indicates the advancing direction and speed of the vehicle, the distance to an indicated destination, a path set by the driver prior to embarking on the trip, and an optimum path leading from the current position to the indicated destination.

However, due to gradual worsening of traffic conditions, it is sometimes difficult to drive even when the above-mentioned navigation apparatus is incorporated in the vehicle. For instance, parking spaces are insufficient in spite of an increase in the demand for vehicles. Additionally road layouts become more complex in accordance with the increased number of vehicles and roads. As the numbers of vehicles increases, the possibility of contact between vehicles also increases. In other words, the probability of accidents increases correspondingly. Such contact accidents occur frequently when it is difficult to recognize the peripheral situation as in the case when a vehicle starts to move or is being parked. In particular, it is difficult for drivers to locate persons or other vehicles existing in a blind spot. For this reason, there is a concern about accidents and hazards to human lives.

In order to solve the above-mentioned problems, a navigation apparatus has been proposed which is adapted to sense whether or not there is an object approaching the vehicle, and to show the sensed object to the driver of the vehicle. Such a navigation apparatus is disclosed in Korean Patent Application No. 95-56570 filed on Dec. 26, 1995 in the name of the assignee, SAMSUNG Electronics Co, Ltd.

In the case of the above-mentioned pending application, the position of an object existing in the vicinity of the vehicle is sensed by an infrared sensor. The distance between the object and the vehicle is also calculated. Based on the results of the sensing and calculating operations, the object is shown on a display unit in the form of a two-dimensional graphic display. However, it is very difficult to determine peripheral situations above and beneath the vehicle because the sensed object is shown in the form of a two-dimensional graphic display. Since the technique disclosed in the pending application only provides a function of simply showing the peripheral situations of the vehicle, it is difficult to determine the degree of hazard which may cause contact of the vehicles with peripheral objects.

Moreover, while it may be relatively easy to determine the direction of the wheels while the vehicles is in motion, it is sometimes impossible to determine the position of the wheels when the car is not in motion. This is especially the case when the car has been parked. In this case, it is difficult for the driver to determine the correct steering position of the steering wheel.

SUMMARY OF THE INVENTION

Therefore, an object of the present invention is to provide a navigation apparatus capable of sensing and three-dimensionally displaying the peripheral situation of the vehicle.

Another object of the present invention is to provide a method for sensing and three-dimensionally displaying the peripheral situation of the vehicle.

Still another object of the present invention is to provide a navigation apparatus capable of sensing the peripheral situation of the vehicle, and providing an alarm to the driver when the peripheral situation is determined as a hazardous situation, and to provide a method for controlling the navigation apparatus.

Yet another object of the present invention is to provide a navigation apparatus having a function of sensing and displaying the steered position of the wheels of the vehicle, and to provide a method for controlling the navigation apparatus.

Further another object of the present invention is to provide a navigation apparatus capable of displaying the peripheral situation of the vehicle and the steered position of the wheels, thereby preventing accidents.

In accordance with the present invention, these objects are accomplished through a navigation apparatus comprising a current-position computing unit for computing the current position of the vehicle, based on information obtained from a speed sensor, a gyro, and GPS satellites. A plurality of infrared sensors and a plurality of cameras are also provided for sensing peripheral objects existing in the vicinity of the vehicle, and outputting three-dimensional images of the sensed peripheral objects. An alarming unit is incorporated for generating a sound signal informing of a hazard in response to an alarming control signal. The display unit receives various display data and display the data on a screen. A wheel angle sensing unit indicates the angle of the wheels.

A system control unit is used for calculating a position of each peripheral object, based on information obtained by the infrared sensors and cameras, and sending display data about the image of the peripheral object along with display data of the current vehicle position to the display unit. The system control unit also sends the alarm control signal to the alarming unit when the distance to a peripheral object corresponds to a preset hazardous distance. Additionally the unit sends display data of the angle of the wheels in response to a display selecting signal.

The system control unit calculates position values (coordinates) of objects, existing in the vicinity of the vehicle, sensed by a plurality of infrared sensors and a plurality of cameras, based on the computed current vehicle position. The system control unit controls the three-dimensional display of the current position of the vehicle and the positions of the peripheral objects, by use of the calculated position values of the peripheral objects. When a hazardous situation exists due to an approach of the vehicle to a peripheral object, the system control unit sends an alarming control signal to the alarming unit in order to inform the driver of the hazardous situation (contact accident). During such operations, the system control unit can send an output from the wheel angle sensing unit to the display unit at the request of the driver, thereby displaying the angle of the wheels on the display unit. In accordance with these operations, the driver can identifies the current position of the vehicle and the positions of the peripheral objects, for example, other vehicles or persons. The driver can also realize the presence of a hazardous situation. It is also possible to identify the wheel's angle of the vehicle. Accordingly, it is possible to more accurately manipulate the steering wheel of the vehicle in a limited place such as a parking place.

BRIEF DESCRIPTION OF THE DRAWINGS

Other objects and aspects of the invention will become apparent from the following description of preferred embodiments with reference to the accompanying drawings in which.

DETAILED DESCRIPTION OF THE PREFERRED EMBODIMENT(S)

Figure 1:
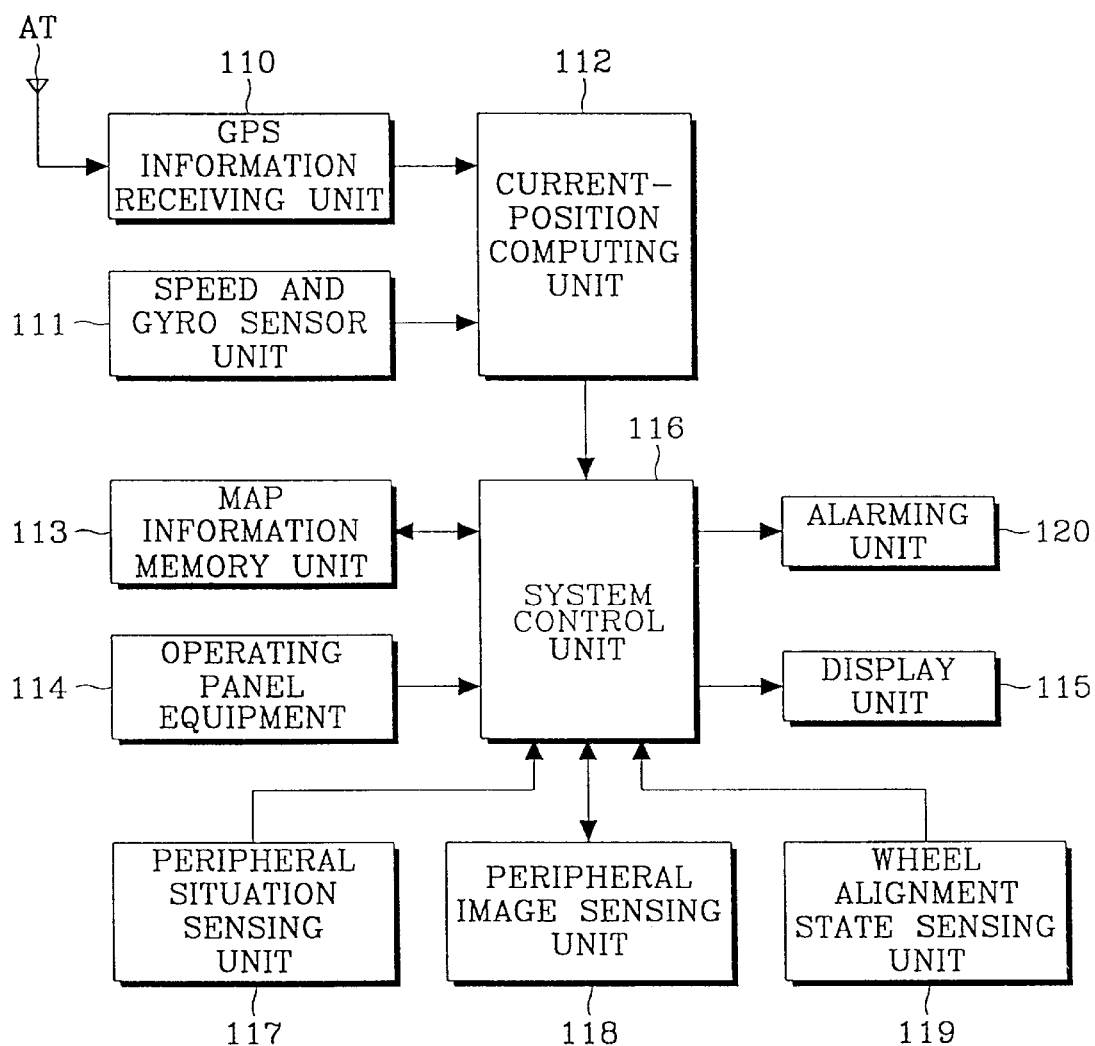
FIG. 1 is a block diagram of a navigation apparatus for vehicles in accordance with a preferred embodiment of the present invention.

FIG. 1 illustrates a block diagram of a navigation apparatus for vehicles in accordance with a preferred embodiment of the present invention.

As shown in FIG. 1, the navigation apparatus includes a GPS information receiving unit 110 adapted to receive transmissions from a plurality of GPS satellites via an antenna AT, and to calculate pseudo coordinates associated with the current position of the vehicle. The navigation apparatus also includes a speed and gyro sensor unit 111 for detecting the current running speed and azimuth angle of the vehicle. The speed and gyro sensor unit 111 includes a speed sensor and a gyro sensor respectively adapted to sense the running speed and azimuth angle of the vehicle, thereby outputting information about the sensed running speed and azimuth angle. The output from the GPS information receiving unit 110 and the output from the speed and gyro sensor unit 111 are applied to a current-position computing unit 112.

The current-position computing unit 112 calculates a pseudo current position of the vehicle, based on the running speed and azimuth angle of the vehicle output from the speed and gyro sensor unit 111. The current-position computing unit 112 also selects the calculated pseudo position value or the pseudo position value received from the GPS information receiving unit 110, responsive to the pseudo current-position coordinates received from the GPS information receiving unit 110, and outputs the selected value. The selection of a pseudo position value is based on the magnitude of an error in the speed and azimuth angle output from the speed and gyro sensor unit 111. For example, the calculated value is selected when the accumulative error in information signals output from the speed and gyro sensor unit 111 is small. When the accumulative error is large, it is corrected using the value output from the GPS information receiving unit 110. In addition to the calculation of the current position of the vehicle, the current-position computing unit 112 operating as mentioned above, also calculates information about the running of the vehicle such as information about the speed and advancing direction of the vehicle. The finally calculated information about the running of the vehicle is sent to a system control unit 116.

Referring to FIG. 1, a map information memory unit 113 stores map information and other additional data therein. Under control of the system control unit 116, the map information memory unit 113 accesses the map information and other additional data and sends the accessed information to the system control unit 116. The navigation apparatus further includes an operating panel equipment (OPE) 114 having a plurality of function keys adapted to effectively operate the navigation apparatus, thereby establishing an interface between the user and the navigation apparatus. A display unit 115 is also coupled to the system control unit 116 to display map information read from the map information memory unit 113 along with various conditions occurring in accordance with operations of the navigation device under control of the system control unit 116.

The system control unit 116 includes a ROM stored with a program for controlling the entire operation of the navigation apparatus, and a RAM for temporarily storing data processed during the operation of the navigation apparatus. The system control unit 116 having such a configuration reads map information about areas in the vicinity of the vehicle, based on information about the running of the vehicle output from the current-position computing unit 112. The system control unit 116 then sends the read map information to the display unit 115 which is, in turn, controlled by the system control unit 116 to display the map information.

In addition to the display of the map information, the system control unit 116 also indicates the advancing speed and direction of the vehicle, the distance to a designated destination, the path preset by the driver prior to embarking on the trip, and an optimum path leading to the designated destination. The elements performing the above-mentioned functions are also included in conventional navigation apparatus.

In addition to the above mentioned elements, the navigation apparatus according to the present invention further includes a speed and gyro sensor unit 111, a peripheral situation sensing unit 117, a peripheral image sensing unit 118 and a wheel alignment state sensing unit 119. The speed and gyro sensor unit 111 is also an element of the navigation apparatus according to the present invention. By virtue of these elements, the navigation apparatus of the present invention can always display objects existing in the vicinity of the vehicle, thereby accurately providing the running environment of the vehicle to the driver. In particular, the navigation apparatus of the present invention provides an alarm to the driver when a hazardous situation exists due to an approach of the vehicle to a peripheral object. In addition, this navigation apparatus provides a convenience in sensing the angle of the wheels during the manipulation of the steering wheel performed when the vehicle is being parked in a limited parking space. Such effects will be apparent from the following description.

Figure 2:
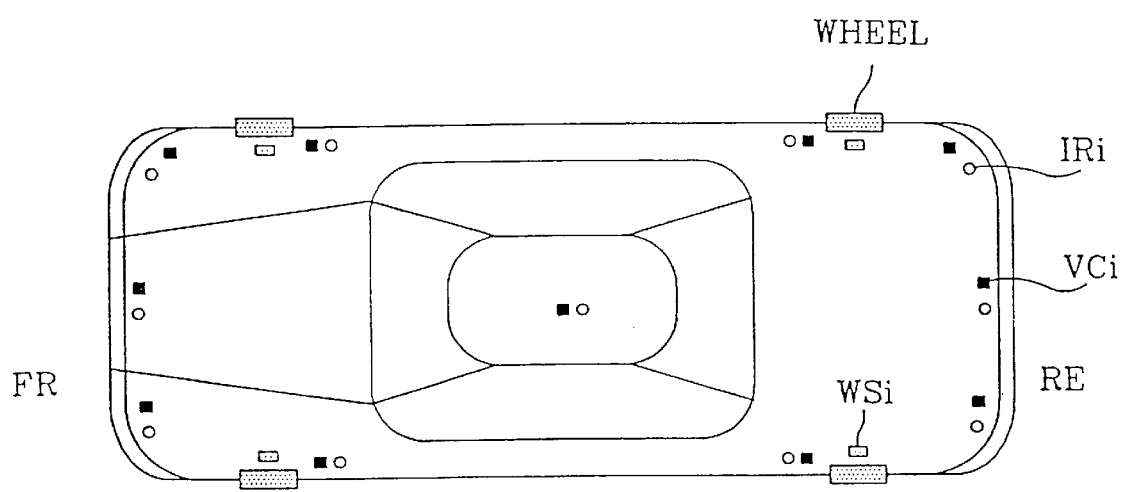
FIG. 2 is a schematic view illustrating the positioning of sensors adapted to sense the angle of the wheels and the peripheral situation of the vehicle, in accordance with a preferred embodiment of the present invention.

The peripheral situation sensing unit 117 is adapted to sense the peripheral situation of the vehicle. This peripheral situation sensing unit 117 includes a plurality of sensors mounted on the outer surface of the vehicle's body and adapted to sense the peripheral situation of the vehicle. An example of such a configuration for the peripheral situation sensing unit 117 is illustrated in FIG. 2. Each sensor of the peripheral situation sensing unit 117 may be an infrared sensor which serves to sense the position of an object and the distance to the objects.

Referring to FIG. 2, a plurality of infrared sensors IRi (i is an integer of 1, 2, 3 . . . n) are shown which serve to sense the peripheral situation of the vehicle. The infrared sensors IRi are mounted on the outer surface of the vehicle while being uniformly spaced from one another. The peripheral situation sensing unit 117, which includes a plurality of infrared sensors IRi, periodically emits infrared rays in forward, rearward, left and right directions under control of the system control unit 116. The peripheral situation sensing unit 117 detects whether or not there is a reflected infrared ray, thereby detecting whether or not an object exists in the vicinity of the vehicle. When the peripheral situation sensing unit 117 detects an object existing in the vicinity of the vehicle, it sends a position detecting signal to the system control unit 116. For instance, where the infrared sensor IRi positioned on the right side portion of the vehicle detects an object existing in the vicinity of the vehicle, it outputs a signal indicative of the existence of the object to the right of the vehicle. Based on the output from the peripheral situation sensing unit 117, the system control unit 116 detects the distance between the vehicle and the object by computing the time taken to receive an infrared ray reflected from the object after transmitting the infrared ray to the object. Thus, the system control unit 116 recognizes the position of the object. Such infrared sensors may be mounted on the roof of the vehicle to sense an object existing above the vehicle.

The peripheral image sensing unit 118 is adapted to obtain image information about the peripheral situation of the vehicle. The peripheral image sensing unit 118 includes a plurality of image sensors. Preferably, the image sensors correspond in number to the infrared sensors IRi. For such image sensors, video cameras VCi shown in FIG. 2 may be used. The video cameras VCi are controlled by the system control unit 116. Images of objects picked up by the video cameras VCi are applied to the system control unit 116.

For instance, where an object existing to the left of the vehicle is sensed by the peripheral situation sensing unit 117, the video cameras VCi (three video cameras in the illustrated case) attached on the left side portion of the vehicle generate video signals indicative of picked-up images, respectively. The system control unit 116 processes the video signals received from the video cameras VCi, thereby outputting a video signal indicative of a three-dimensional image of the object. The video signal from the system control unit 116 is applied to the display unit 115 which, in turn, three-dimensionally displays the image of the object existing to the left of the vehicle.

The wheel alignment state sensing unit 119 as shown in FIG. 2 includes wheel alignment state sensors WSi respectively adapted to sense the positions of the wheels of the vehicle, in particular, the front wheels steered in accordance with the steering operation of the steering wheel. Each wheel alignment state sensor WSi detects the steered angle of each wheel from the longitudinal axis of the vehicle body, thereby sensing the steered position or direction of the wheels. For such wheel alignment state sensors, cameras or angular-velocity sensors may be employed. The wheel alignment state sensing unit 119 generates a wheel alignment state sensing signal in accordance with its sensing operation and sends the wheel alignment state sensing signal to the system control unit 116. When the user or the driver requests to display the sensed wheel alignment state, the system control unit 116 sends the wheel alignment state sensing signal to the display unit 115 which, in turn, displays the sensed wheel alignment state.

An alarming unit 120 is coupled to an output port of the system control unit 116 to provide an alarm informing of a hazardous situation in response to an alarm control signal from the system control unit 116. The alarming unit 120 includes a speaker. An alarming situation is determined when the coordinates of the sensed peripheral object approach the pseudo coordinates of the current vehicle position to within a predetermined value.

FIG. 2 shows the positioning of the sensors adapted to sense the wheel steering angle and peripheral situation of the vehicle. In FIG. 2, the reference character "FR" denotes the front of the vehicle whereas the reference character "RE" denotes the rear of the vehicle. Referring to FIG. 2, it can be found that a plurality of infrared sensors IRi are attached to the outer surface of the vehicle to best sense objects existing in the vicinity of the vehicle. A plurality of image sensors VCi are also mounted on the outer surface of the vehicle at positions respectively near to the infrared sensors IRi to obtain images of the peripheral objects. A plurality of wheel alignment state sensors WSi are also provided in the vicinity of the front and rear wheels, respectively, to sense the steered angle of the front and rear wheels with respect to the vehicle body (taking into account vehicles with four-wheel steering).

Figure 3:
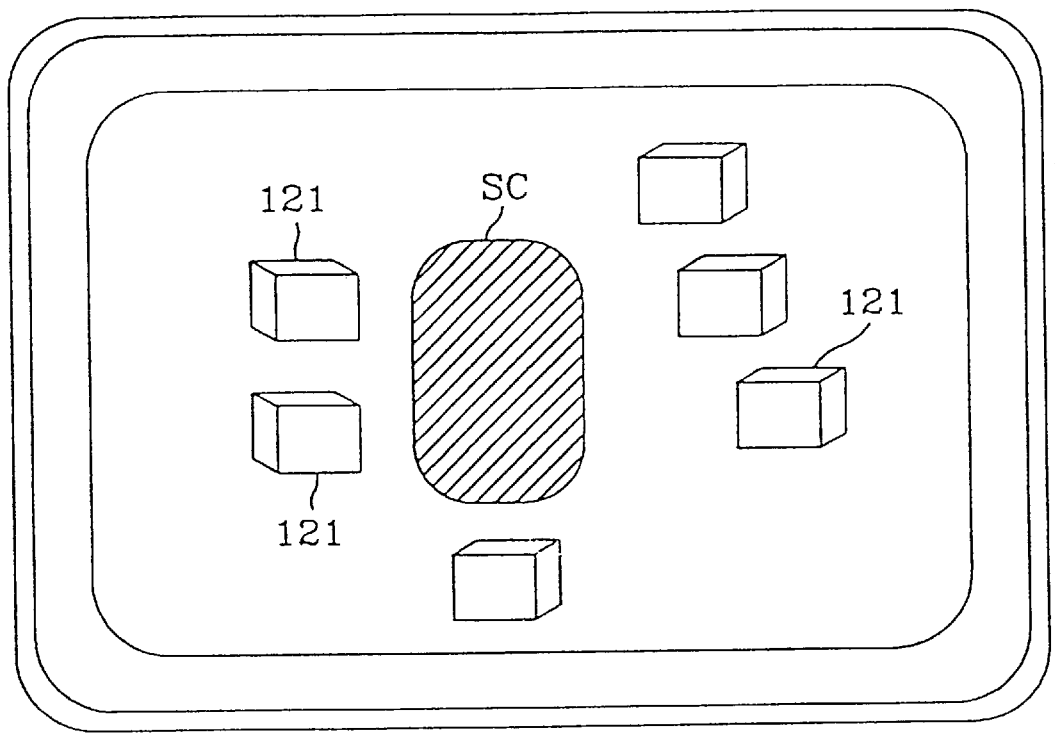
FIG. 3 is a schematic view illustrating a screen on which images of peripheral objects sensed by the navigation apparatus of the present invention are displayed.
Figure 4:
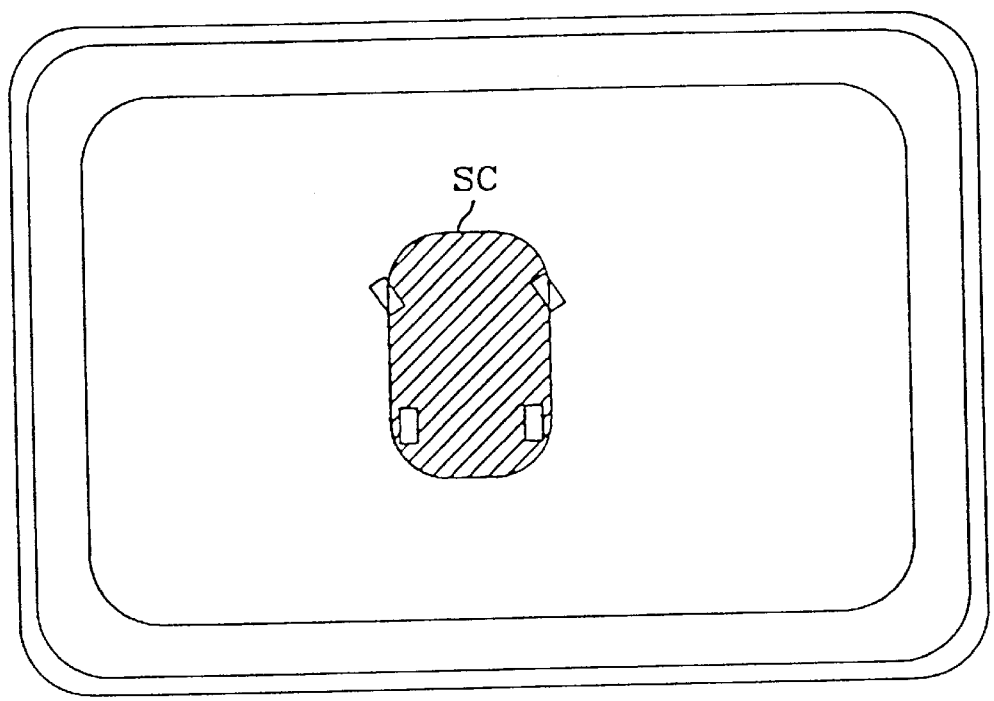
FIG. 4 is a schematic view illustrating the steered state of the vehicle wheels sensed by the navigation apparatus of the present invention.

FIG. 3 is a schematic view illustrating a screen on which images of peripheral objects sensed by the navigation apparatus of the present invention are displayed. FIG. 4 is a schematic view illustrating the steered state of the vehicle wheels sensed by the navigation apparatus of the present invention. In FIGS. 3 and 4, the reference character "SC" denotes the vehicle in which the navigation apparatus of the present invention is incorporated. The reference numeral 121 denotes three-dimensional images of peripheral objects sensed by the peripheral situation sensors.

Now, the operation of the navigation apparatus having the above-mentioned configuration will be described. In the following description, it is assumed that a plurality of objects, for example, vehicles or persons, exist in the vicinity of a vehicle in which the navigation apparatus of FIG. 1 is incorporated.

When the user or the driver selects a peripheral object sensing key on the operating panel equipment 114, the system control unit 116 responses by controlling the peripheral situation sensing unit 117 to thereby cause the infrared sensors of FIG. 2 to operate. In accordance with the operation of the infrared sensors, the peripheral situation sensing unit 117 sends, to the system control unit 116, a signal indicative of the result of sensing objects existing in the vicinity of the vehicle. Based on the signal received from the peripheral situation sensing unit 117, the system control unit 116 determines the distance between the vehicle and each object associated with the received signal.

The system control unit 116 then identifies the position of each object based on the pseudo current position of the vehicle computed by the current position computing unit 112. Thereafter, the system control unit 116 receives an output from the peripheral image sensing unit 118 to obtain image information about each position-identified object. The system control unit 116 sends the image information to the display unit 115 which, in turn, three-dimensionally displays the image of each object. At this moment, it should be noted that the image of each object may be displayed overlapping a map read from the map information memory unit 113.

When the system control unit 116 determines that the distance between the vehicle and a sensed peripheral object is equal to or smaller than a predetermined distance, that is, it determines that there is a hazard which may cause contact of the vehicle with peripheral objects, it sends an alarming control signal to the alarming unit 120. In response to the alarming control signal, the alarming unit 120 generates an alarm through a speaker, thereby informing the driver of a hazardous situation. The alarm may be a voice sound generated by reproducing a previously stored voice message or a simple buzzer sound.

Accordingly, the driver can safely drive the vehicle relying on the information provided by the display unit 115. In particular, it is possible to prevent contact accidents because the navigation apparatus of the present invention automatically alarms the driver when the vehicle approaches an object.

As noted above, the navigation apparatus according to the preferred embodiment also senses the steering angle of the vehicle and displays the steering angle on the screen of the display unit 115. The driver can select a wheel alignment state sensing key provided on the operating panel equipment 114 to more accurately manipulate the steering wheel of his vehicle. This feature is particularly beneficial when driving or parking the vehicle in a limited place such as a congested parking place where other vehicles are parked to the front, rear, left or right of the vehicle. In this case, the system control unit 116 senses the current steering angle from the wheel alignment state sensing unit 119 in response to the selection of the wheel alignment state sensing key.

Subsequently, the system control unit 116 produces an image indicative of the steering angle and then controls the display unit 115 to display the steering angle on the screen as shown in FIG. 4.

Thus, the navigation apparatus of the present invention can display the vehicle SC and the peripheral objects 121 on the display unit 115, as shown in FIG. 3. The navigation apparatus also can display the wheel alignment state of the vehicle SC on the display unit 115, as shown in FIG. 4.

In accordance with the present invention, the images of the vehicle SC and peripheral objects 121 can be displayed on the display unit 115 at an enlarged or reduced scale. For example, the user may select an image enlarging/reducing key provided at the display unit 115 to enlarge or reduce the scale of the images displayed on the display unit 115 as illustrated in FIG. 3 or 4. In this case, the system control unit 116 enlarges or reduces the images of peripheral situations displayed on the display unit 115. In accordance with such an operation, the driver can more accurately see desired portions of the images of his vehicle and peripheral objects or vehicles displayed on the display unit 115, so that he can realize a peripheral situation of a widened range.

As apparent from the above description, the present invention provides a navigation apparatus capable of not only displaying the vehicle along with a peripheral situation of the vehicle, but also informing of a hazardous situation. Accordingly, the driver can perceive the peripheral situation by watching the screen of the display unit without directly looking at the conditions of the surrounding vicinity. In particular, it is possible to prevent contact accidents because the navigation apparatus of the present invention automatically provides an alarm to the driver when the vehicle dangerously approaches an object. In particular, the driver can locate persons or other vehicles existing in blind spots. Accordingly, it is possible to prevent contact accidents even in the case when the vehicle is running or being parked in a limited parking space. In addition, the present invention provides an advantage in that the driver can perceive the peripheral situation of the vehicle in a bad operating environment in which it is difficult to realize the surrounding vicinity of the vehicle due to, for example, rainy weather.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A navigation apparatus for a vehicle comprising a current-position computing unit for computing a current position of said vehicle, based on information obtained by a speed sensor, a gyro and a global position system, comprising:

a plurality of infrared sensors and a plurality of cameras for sensing peripheral objects existing in the vicinity of said vehicle and outputting three-dimensional images of the sensed peripheral objects;

an alarming unit for generating a sound signal informing of a hazard in response to an alarming control signal;

a display unit for receiving display data and displaying the received display data on a screen;

a wheel alignment state sensing unit for sensing a wheel steering angle of said vehicle; and a system control unit for calculating a position of each peripheral object, based on information obtained by the infrared sensors and cameras, sending display data about the image of the sensed peripheral object along with display data about an image of the computed current vehicle position to said display unit, sending said alarming control signal to said alarming unit when a distance between the current vehicle position and the calculated peripheral object position corresponds to a hazardous distance, and sending display data about the sensed wheel steering angle to said display unit in response to a display selecting signal.

2. The navigation apparatus in accordance with claim 1, wherein said wheel alignment state sensing unit comprises a plurality of cameras or angular-velocity sensors respectively mounted on said vehicle in the vicinity of wheels of said vehicle to sense the steered positions of the wheels.

3. The navigation apparatus in accordance with claim 2, wherein said alarming unit comprises a speaker mounted in the vehicle to inform of a hazardous situation in response to the receipt of said alarming control signal.

4. The navigation apparatus in accordance with claim 1, wherein said alarming unit comprises a speaker mounted in said vehicle to inform of a hazardous situation in response to the receipt of said alarming control signal.

5. A method for controlling a navigation apparatus for a vehicle including a plurality of infrared sensors and a plurality of cameras mounted on the outer surface of said vehicle, a wheel alignment state sensing unit respectively mounted on said vehicle in the vicinity of the wheels of said vehicle and adapted to sense a wheel steering angle of the wheels, an alarming unit for generating a sound signal informing of a hazardous situation in response to an alarming control signal, a current-position computing unit for computing a current position value of said vehicle, based on information obtained by a speed sensor, a gyro and a global position system, and a display unit for receiving display data and displaying the received display data on a screen, comprising said steps of:

detecting information about positions of objects, which exist in the vicinity of said vehicle, sensed by said infrared sensors, based on the current vehicle position value computed by said current-position computing unit;

receiving images of the objects picked up by the cameras and displaying images of said vehicle and objects on said display unit, based on the computed current vehicle position value along with a position value of each object;

sending said alarming control signal to said alarming unit when a difference between the computed current vehicle position value and the object position value is equal to or less than a predetermined value; and displaying the sensed wheel steering angle on said display unit in response to an external control signal, based on an output from said wheel alignment state sensing unit.

* * * * *